Sept. 11, 1962     J. W. NELSON ET AL     3,053,975
APPARATUS AND METHOD FOR ARC WELDING
Filed March 11, 1960     3 Sheets-Sheet 1

Jerome W. Nelson
Harry C. Cook    Inventors

By W.O.T Heilman

Patent Attorney

Sept. 11, 1962   J. W. NELSON ET AL   3,053,975
APPARATUS AND METHOD FOR ARC WELDING
Filed March 11, 1960   3 Sheets-Sheet 2

Jerome W. Nelson
Harry C. Cook         Inventors

By W.O.T Feilman

Patent Attorney

Sept. 11, 1962 J. W. NELSON ET AL 3,053,975
APPARATUS AND METHOD FOR ARC WELDING
Filed March 11, 1960 3 Sheets-Sheet 3

Jerome W. Nelson
Harry C. Cook   Inventors

By  W. O. Heilman
Patent Attorney

United States Patent Office 3,053,975
Patented Sept. 11, 1962

3,053,975
APPARATUS AND METHOD FOR ARC WELDING
Jerome W. Nelson, Columbus, Ohio, and Harry C. Cook, Orange, N.J., assignors, by direct and mesne assignments, to Esso Research and Engineering Company, a corporation of Delaware
Filed Mar. 11, 1960, Ser. No. 14,247
17 Claims. (Cl. 219—130)

This invention relates to an apparatus and method for fusion arc welding. It relates particularly to an apparatus and method for fusion arc welding in narrow deep grooves, and it relates more particularly to such an apparatus and method wherein and whereby a controlled variation is imposed on the speed of feeding of the welding wire between which wire and the base metal the arc is struck.

When metal members such as plates or pipes are to be joined mutually edgewise or endwise by the fusion technique of arc welding it has been customary to bevel these members along their edges or ends where the joint is to be made. Thus, when the members are placed in closely adjacent relation for the actual welding process a V-groove will exist between them. The plate or pipe members constituting the base elements to be joined will usually be in contact with each other at least substantially continuously along a line or very narrow surface at the root or apex of the groove. A backing bar or ring, subject to later removal, may be disposed beyond this apex.

In the actual joining operation, the V-groove between the base elements will be essentially entirely filled with weld metal deposited from a separate wire or rod. More than this, in keeping with sound and accepted practice, the deposited weld metal should be slightly convex or crowned beyond the surfaces of the joined elements adjacent what was previously the open side of the V-groove. Bearing in mind that this groove may have an included angle of 60° or greater, it will be seen that for plate or pipe wall thickness equal to or in excess of 0.250", for example, the amount of weld metal required to fill and crown any given length of groove may not be inconsiderable in terms of the length of the groove. Specifically, and quite importantly for purposes of this invention, it may not be possible to make a satisfactory welded joint across a V-groove in such thickness of metal with a single pass of the welding rod or wire.

The more welding passes that are required to make a satisfactory joint, the lower will be the production rate achieved whether this be measured in terms of lineal feet of weld, number of joints, number of completed assemblies, or any other appropriate and convenient quantity. To improve production rates, one thing which might be done would be to increase the diameter of the welding wire or rod to lay a heavier bead of weld metal in a single pass in a given V-groove. Another thing which might be done, and with which the apparatus and method of this invention are concerned, would be to redesign the groove to require less weld metal per unit length of the joint affected.

One design of welding groove or kerf which has been tried in the cases of plates and pipes which are to be joined mutually edgewise or endwise is that calling for essentially parallel sides with only relatively narrow spacing therebetween. An example of such a groove would be one existing between two axially-aligned pipe members, each having a wall thickness of about 0.375" and being squarely cut off at their adjacent ends with these ends in turn being spaced about 0.060" apart. This groove would normally be bottomless except as it might be provided with a backing ring inside the pipe members, or else have at least one pipe member cut with an external shoulder at its end adjacent and in this case touching the other pipe member, such a shoulder having an outside diameter only slightly greater than the inside diameter of the pipe whereon it was formed to give a relatively thin shoulder wall.

In any case, bottomed or bottomless, the groove described above will have considerably less volume per unit of length than would a 60° V-groove between plates or pipes of 0.375" thickness. Additionally, however, it will be proportioned as a narrow deep groove, and this will at least tend to make control of the arc more difficult for achievement in single pass welding of certain results which are important requirements of satisfactory welds generally. For example, the arc must be controlled to give sound and substantially uniform root conditions of the weld; to avoid burning through at the bottom or distant surfaces of the members being welded; to fill the groove completely with weld metal, and, preferably and almost necessarily, provide a convex or crowned surface on the deposited weld metal adjacent the top or near surfaces of the members being welded.

Assuming that equipment and techniques are available to permit satisfactory welding with the use of either bottomed or bottomless grooves, it will ordinarily be preferable to use a bottomless groove. This will obviate installation and removal of a backing ring or bar or provision of a shoulder on at least one of the members being joined, and so reduce welding costs. The utility of the apparatus and method of this invention to exercise control over a welding arc to achieve results of the kind just indicated is not, however, contingent upon the welding groove being either bottomed or bottomless.

According to this invention, an apparatus and method for fusion arc welding are provided in which the welding wire constituting the filler material for the groove between the base elements is fed toward the groove at a speed which is controllably varied as relative motion takes place in line with the groove between the members being joined and the welding head or other means carrying and guiding the wire, and the wire is itself consumed at the arc. This variation is of a cyclical nature, itself being variable in respect of both amplitude and frequency. As wire feed speed is varied, the arc will be oscillated up and down in the welding groove to give satisfactory deposition of weld metal and fusion thereof with the base elements of the joint being fabricated at all levels of the welding groove. Furthermore, within a reasonable limit of base element thickness, this satisfactory deposition and fusion will be achieved in a single welding pass.

The nature and substance of this invention may be more clearly perceived and fully understood by referring to the following description and claims taken in connection with the accompanying drawings in which:

Figure 1:
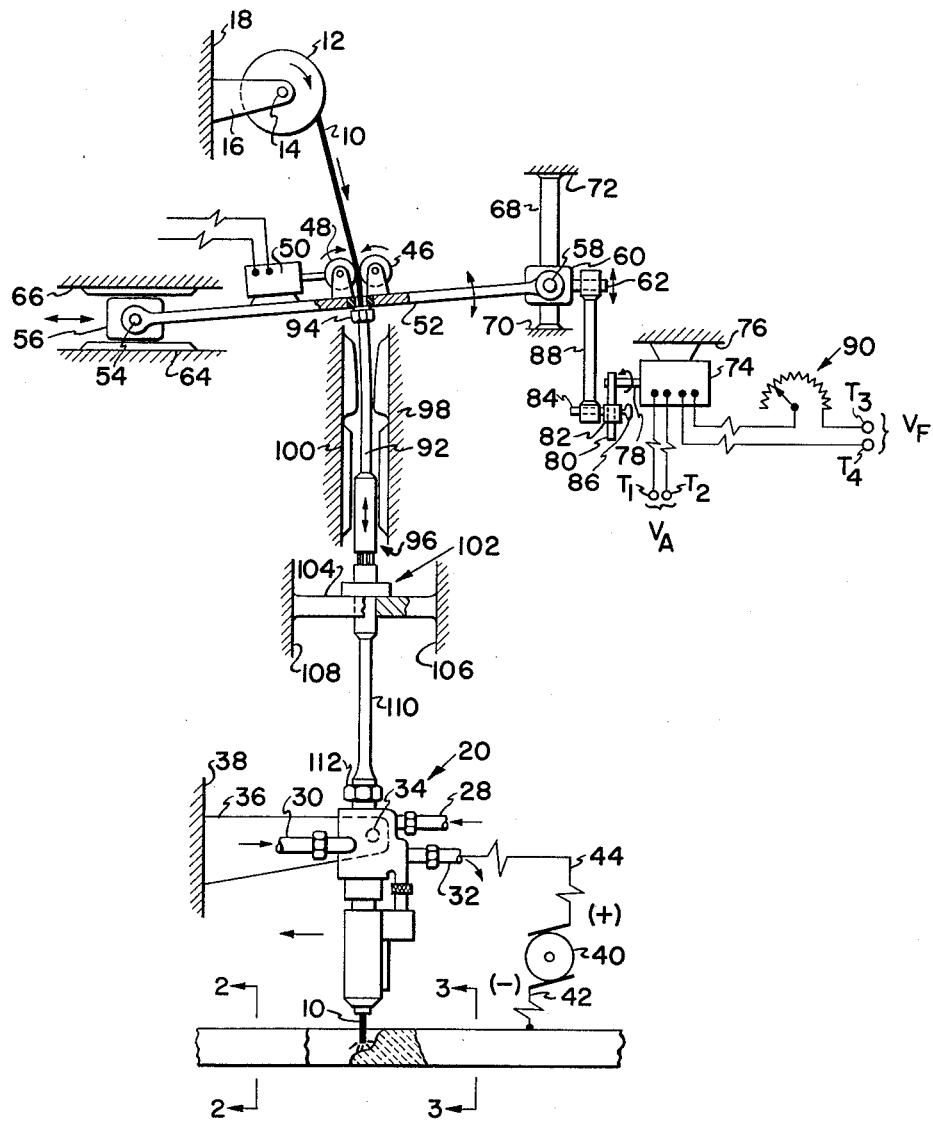
FIG. 1 represents a partially schematic and partially structural diagram of an apparatus embodiment of this invention wherein oscillatory motion is imposed upon the support means for the welding wire drive rolls and drive motor.
Figure 2:
FIG. 2 represents a view in section along line 2—2 in FIG. 1 in the direction of the arrows showing the general shape and proportions of the groove between the base elements intended to be joined by welding.
Figure 3:
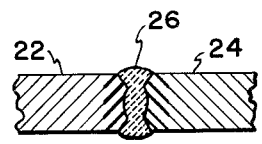
FIG. 3 represents a view in section along line 3—3 in FIG. 1 in the direction of the arrows showing the general shape and proportions of a welded joint of desirable configuration formed between base elements initially separated by a groove substantially similar to that shown in FIG. 2.

Referring now to the drawings in detail, especially to FIGS. 1, 2, and 3 thereof, a welding wire 10 is wound in coil form on a reel or spool 12. This reel is rotatably supported on a shaft 14 which is carried in at least one bracket 16. This bracket is set on a foundation structure 18. Wire 10 extends and is continuously fed through a number of intermediate apparatus elements to be described subsequently until it reaches, passes through, and projects downwardly beyond a welding head assembly 20 of a generally conventional nature. Electrical insulation should be provided on reel 12 or at least on shaft 14 to prevent flow of current from wire 10 back to and through bracket 16 and foundation 18.

The wire terminates and is continuously burned off to deposit weld metal in a narrow deep groove such as that shown in FIG. 2 which is defined between two pieces of base metal 22 and 24. Welding head 20 is in motion relative to base elements 22 and 24 as indicated by the arrow alongside the head. As this motion is continued, weld metal will be deposited steadily along the groove to fuse with base elements 22 and 24 and form a joint which will be desirably of the approximate transverse contour shown in FIG. 3 wherein the deposited metal is designated 26.

The welding head is characterized by a conduit 28 wherethrough it is supplied with a gas such as carbon dioxide for arc-shielding purposes; a conduit 30 wherethrough it is supplied with water for internal cooling purposes, and a conduit 32 wherethrough spent cooling water is discharged from the interior of the head assembly. Conduit 32 serves also as a means for bringing in an electrical lead to the welding head as will be discussed in greater detail hereinafter. The whole welding head assembly is supported on a pin 34 which is carried in a bracket 36. This support may be of a rotatable nature, with either head 20 turning on pin 34 or the pin turning in bracket 36, to allow the lower end of wire 10 to be set at any angle with respect to base elements 22 and 24 for achievement of best welding results. The most desirable angular setting of the head and wire will be determined by experiment.

Bracket 36 is set on a foundation structure 38. This structure will be in a fixed spatial relation to foundation structure 18. Both these structures may, however, be movable in the absolute sense to provide a traverse of welding head 20 along the groove between the elements being joined. On the other hand, relative motion between the welding head and base elements 22 and 24 may be achieved by moving these elements with welding head 20 remaining absolutely stationary. The present invention is not concerned, however, with any method or means whereby this relative motion is achieved.

Electric power for welding is furnished by direct current generator 40. This machine is connected to the base elements 22 and 24 by means of lead 42, and to welding wire 10 by means of lead 44. The latter lead enters welding head 20 through water discharge conduit 32 as hereinbefore pointed out, and within the head structure it makes a sliding contact with the welding wire. Generator 40 is indicated as being connected electrically to make wire 10 positive with respect to the base elements being joined. Such connection is known as "reverse polarity," and is in contrast to a "straight polarity" connection wherein the wire would be electrically negative with respect to the base elements. Reverse polarity is preferred over straight polarity because it provides better arc stability. The present invention does not reside, however, in any particular circuit arrangement for creating the necessary electrical potential between the welding wire and the base elements.

As it extends from reel 12, welding wire 10 passes first of all through drive rolls 46 and 48. These rolls are electrically insulated to prevent current flow through or from them from wire 10 which is at an elevated potential. Rolls 46 and 48 are driven by an electric motor 50. The mechanical connection between the rolls and the motor and between the rolls themselves may be of any conventional kind, and does not constitute any part of the present invention.

The wire-driving mechanism comprising motor 50 and rolls 46 and 48 is mounted on a support and stroking plate 52 which is shown edgewise in FIG. 1. This plate is provided with a hole wherethrough welding wire 10 passes downwardly after leaving the rolls. If plate 52 be made of metal, the hole therein for passage of wire 10 should be fitted with an electrically insulating sleeve or bushing. At both its left and right ends, plate 52 is enlarged in the plane of its edge dimension and drilled and otherwise appropriately treated to provide bearing surface for a wrist pin. At its left end, support plate 52 is fitted onto wrist pin 54 set fixedly in crosshead slide 56, and at its right end the plate is fitted onto wrist pin 58 set fixedly in crosshead slide 60. Crosshead slide 60 also has a wrist pin 62 set fixedly therein approximately perpendicularly to wrist pin 58 as shown. The attachment made to and the function of wrist pin 62 will be explained more completely hereinafter.

Crosshead slide 56 is supported in and guided horizontally by bearings surfaces formed on foundations 64 and 66. Crosshead slide 60 is bored out to accommodate and be guided vertically by bearing column 68. At its upper and lower ends, column 68 is located fixedly on foundations 70 and 72 respectively. Foundations 64, 66, 70, and 72 are all located fixedly in space with respect to each other and also with respect to foundations 18 and 38.

According to the present invention, certain limited motion may be imposed upon support plate 52. If crosshead slide 60 be moved up and down on column 68, plate 52 will be oscillated about wrist pins 54 and 58. The left end of this plate will also have at least a little translatory motion as crosshead slide 56 moves back and forth on and in the bearing surfaces of foundations 64 and 66. Most important, however, the region of the support plate whereat drive rolls 46 and 48 are located, and wherethrough welding wire 10 passes will be given at least some vertical displacement of a cyclical nature.

Driving power for imposing motion of the kind described upon support plate 52 is furnished by electric motor 74. This motor is supported from foundation 76 which is fixed in space with respect to all other foundations hereinbefore designated. Motor 74 has an output shaft 78 to which is affixed a crank 80. This crank is provided with a crank pin block 82 which has a crank pin 84 fixedly fitted therein. Block 82 has a sliding fit on crank 80, and may be clamped at a plurality of positions along the crank as by means of a set screw 86. By adjustment of the position of block 82 on crank 80, the effective crank throw which is the offset between motor shaft 78 and crank pin 84 may be varied. A connecting rod 88 joins crank pin 84 with wrist pin 62 on crosshead slide 60 to complete the mechanical power transmission linkage between motor 74 and support plate 52.

It is apparent that as the effective throw of crank 80 is varied by adjustment of the position of crank pin block 82 therealong, the amplitude of displacement or the stroke of support plate 52 in the course of one revolution of motor 74 will be varied also. The shorter the effective crank throw, the shorter will be the stroke of support plate 52 measured linearly at the point where welding wire 10 passes through this plate.

For purposes of the present invention it will be desirable not only that the stroke of support plate 52 be variable, but also that its oscillatory frequency be subject to change. This condition may be achieved quite easily by having electric motor 74 of a variable speed variety. As shown, there are four electrical leads going to motor 74 from terminals $T_1$, $T_2$, $T_3$, and $T_4$. In the lead from terminal $T_3$ there is located a rheostat 90. Assuming now that motor 74 is a direct current machine, the leads from terminals $T_1$ and $T_2$ may be considered as connected electrically to the armature windings, and the leads from terminals $T_3$ and $T_4$ as connected to the field windings. A voltage $V_A$ is applied across terminals $T_1$ and $T_2$, and a voltage $V_F$ across terminals $T_3$ and $T_4$. As the setting of rheostat 90 is adjusted to bring more or less of its resistor element into the circuit of the field windings, the speed of motor output shaft 80 will be decreased or increased correspondingly.

As it extends downwardly below support plate 52 toward welding head 20, welding wire 10 is encased for part of its run in a flexible and electrically insulating sleeve 92. At its upper end, sleeve 92 is connected to the underside of support plate 52 by any suitable means such as a compression fitting 94. At its lower end, sleeve 92 terminates in a diametrally enlarged and relatively rigid upper member 96 of a sliding joint to be described more completely hereinafter through which wire 10 passes. Joint member 96 will be of an electrically insulating material such as nylon. Sleeve 92 and joint member 96 will and are intended to move up and down with motion of support plate 52. Guidance for this sleeve and this joint member will be needed to provide them with and maintain them in proper lateral alignment. Such guidance will be provided by bearing surfaces of foundations 98 and 100. These foundations will be fixed in space with respect to all other foundations hereinbefore mentioned.

Upper joint member 96 works cooperatively with lower joint member 102. The nature of this cooperation will be more fully disclosed upon consideration of FIGS. 4 and 5. Lower joint member 102, like upper member 96, is relatively rigid and fabricated of an electrically insulating material such as nylon. It is fixedly secured in a clamp or bracket 104 of which the foundations 106 and 108 are fixed in space with respect to all other foundations hereinbefore designated.

Extending downwardly from the lower end of lower joint member 102 is a sleeve 110 which terminates at its own lower end on welding head 20. Welding wire 10 passes through sleeve 110 to enter the welding head. Connection between sleeve 110 and welding head 20 may be made by any suitable means such as compression fitting 112. Sleeve 110 should be of an electrically insulating material. It may be flexible and have at least a little slack between lower joint member 102 and compression fitting 112 to allow some rotation of welding head 20 on or with pin 34 with respect to bracket 36 and the base elements 22 and 24 of the weldment being fabricated.

Figure 5:
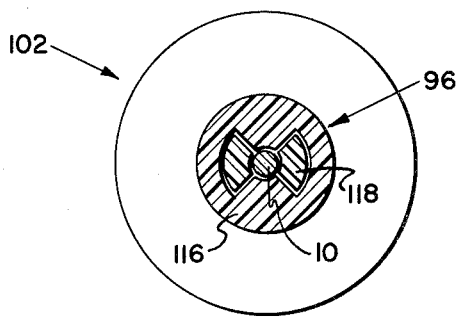
FIG. 5 represents a view in sectional plan through the sliding joint of FIG. 4 along line 5—5 therein in the direction of the arrows.
Figure 4:
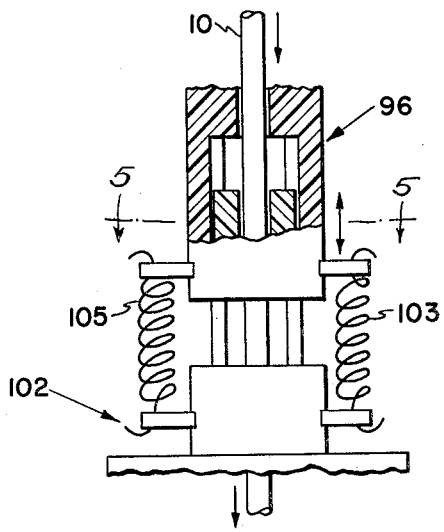
FIG. 4 represents a view in sectional elevation through a portion of the sliding joint of the sleeve surrounding the welding wire shown in FIG. 1.

Referring next to FIGS. 4 and 5, upper joint member 96 is seen to be provided internally with a pair of oppositely disposed splines such as 116 which are so separated and shaped at their facing surfaces to provide close clearance on and guidance for welding wire 10. Lower member 102 is seen to be characterized by two splines such as 118 in its uppermost portion. These splines have a sliding fit within upper joint member 96 between splines 116 thereof. They, like splines 116, are so separated and shaped at their facing surfaces to provide close clearance on and guidance for welding wire 10. Aside from their splined portions, both upper and lower joint members 96 and 102, are, of course, drilled or bored for their entire lengths to allow a relatively close sliding fit of the welding wire therethrough. It should be noted particularly, however, that because of the splined construction of the joint members, welding wire 10 is nowhere entirely lacking in lateral support in its passage through the joint assembly, not even though upper joint member is moved through a range of positions as it is alternately pulled and pushed by sleeve 92 following the motion of support plate 32 to slide up and down on lower joint member 102. Biasing means such as tension springs 103 and 105 between the joint members may obviously be applied to assist upper member 96 on its down stroke.

To consider the overall operation of the apparatus embodiment of this invention shown in FIGS. 1, 4, and 5, with reference to FIGS. 2 and 3 as necessary, suppose that motor 74 is not energized; that motor 50 is energized to turn drive rolls 46 and 48 to advance welding wire 10 continuously; that an arc has been struck between the lower end of wire 10 and base elements 22 and 24, and that there is steady relative motion of the lower end of the welding wire along the groove between the base elements to deposit weld metal in this groove and join these elements. In these circumstances, upon the achievement of stable conditions of operation, wire 10 will be burning back at its lower end at the same rate at which it is being advanced through rolls 46 and 48; that is, the lower end of wire 10 will be in an essentially fixed vertical relation with respect to the top and bottom edges of the groove between base elements 22 and 24.

Now suppose that motor 74 is started to impose oscillatory motion of the kind aforedescribed upon support plate 52 and the motor and drive rolls mounted thereupon. As drive rolls 46 and 48 move up and down, while at the same time being driven steadily in rotation by motor 50, the path which wire 10 must follow from the drive rolls to welding head 20 will be alternately and cyclically lengthened and shortened. As this path is lengthened, the effective feed rate of the wire at the welding head will be reduced. The lower end of the wire will then rise with respect to the top and bottom edges of the groove between base elements 22 and 24. This is because the wire will be being supplied at the point of consumption at a rate less than that at which it is being consumed. Conversely, as the path of the wire is shortened the lower end of the wire will descend with respect to the groove edges because the wire will be being supplied at the point of consumption at a rate greater than that at which it is being consumed.

It may be seen from the foregoing that as operation of motor 74 is continued, the lower end of welding wire 10 will be oscillated up and down with respect to the edges of the groove between base elements 22 and 24; that is, it will be oscillated transversely to the direction of relative motion between welding head 20 and the base elements being joined. Vertical oscillation of the lower end of the wire will, of course, cause oscillation of the arc up and down in the welding groove. Frequency of oscillation of the wire and the arc may be adjusted by means of rheostat 90 wherethrough the speed of motor 74 is regulated. The greater the motor speed, the higher will be the oscillating frequency. Increasing the motor speed will also increase the amplitude of vertical oscillation of the lower end of the wire. Amplitude of oscillation may be adjusted additionally by means of crank pin block 82 wherethrough the effective throw of crank 80 of motor 74 is regulated. The greater the crank throw, the greater will be the oscillatory amplitude.

Figure 6:
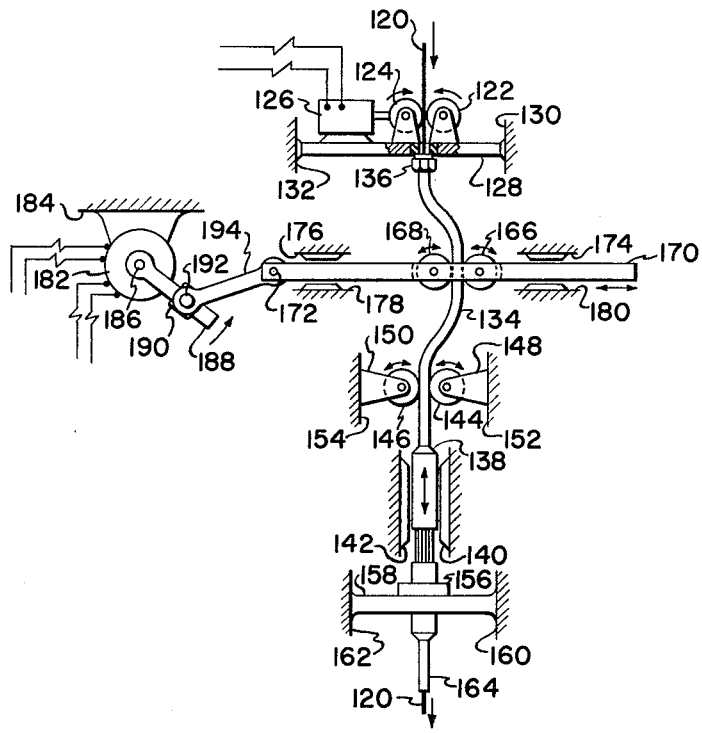
FIG. 6 represents a partially schematic and partially structural diagram of one apparatus embodiment of this invention wherein the welding wire is cyclically flexed.

Referring next to FIG. 6, welding wire 120 descends between a pair of electrically insulated drive rolls 122 and 124 which are rotated by motor 126. These rolls and this motor are located on a support plate 128 which is retained fixedly on foundations 130 and 132. At its upper end, wire 120 may be assumed as coming down from a storage and dispensing apparatus such as that of FIG. 1 comprising reel 12, shaft 14, bracket 16, and foundation 18. This latter foundation will be in fixed spatial relation to foundations 130 and 132. At its lower end, wire 120 may be assumed as passing through and being continuously burned off beyond a consuming apparatus such as that of FIG. 1 comprising welding head 20, pin 34, bracket 36, and foundation 38. This latter foundation will be in fixed spatial relation to foundations 130 and 132.

Burning off of wire 120 may be assumed to be taking place in the course of making a welded joint across a groove between two base elements such as 22 and 24 shown in FIGS. 1 and 2. A direct current generator such as generator 40 may be assumed to be present and connected in reverse polarity to welding wire 120 similarly to wire 10 on the one hand and the base elements on the other, likewise all as shown in FIG. 1. Further, relative motion may be assumed between the welding head and the base elements to provide a traverse of the head and thus of welding wire 120 along the groove between the elements being joined.

Support plate 128 is provided with a hole wherethrough welding wire 120 passes downwardly after leaving drive rolls 122 and 124. If plate 128 be made of metal, the hole therein for passage of wire 120 should be fitted with an electrically insulating sleeve or bushing. As it extends downwardly below support plate 128 toward the welding head, welding wire 120 is encased for part of its run in a flexible and electrically insulating sleeve 134. At its upper end, sleeve 134 is connected to the underside of support plate 128 by any suitable means such as a compression fitting 136. At its lower end, having passed through a number of intermediate apparatus elements to be described subsequently, sleeve 134 terminates in a diametrally enlarged and relatively rigid upper member 138 of a sliding joint through which wire 120 passes.

Joint member 138 will be of an electrically insulating material such as nylon. This joint member and at least part of sleeve 134 will and are intended to move up and down in the course of action of a stroking apparatus to be described subsequently. Guidance for joint member 138 and the part of the flexible sleeve moving vertically therewith will be needed to provide them with and retain them in proper lateral alignment. The upper joint member will be so guided by bearing surfaces of foundations 140 and 142. The vertically moving part of sleeve 134 will be so guided by rolls 144 and 146 pivoted in brackets 148 and 150 which are set on foundations 152 and 154. Foundations 140, 142, 152, and 154 will all be fixed in space with respect to all other foundations hereinbefore designated in connection with the apparatus of FIG. 6.

Upper joint member 138 works cooperatively with lower joint member 156. The nature of this cooperation is essentially the same as that of that between upper and lower joint members 96 and 102 illustrated in and described in connection with FIGS. 1, 4 and 5. Lower joint member 156, like upper member 138, is relatively rigid and fabricated of an electrically insulating material such as nylon. It is fixedly secured in a clamp or bracket 158 of which the foundations 160 and 162 are fixed in space with respect to all other foundations hereinbefore designated in connection with the apparatus of FIG. 6. Extending downwardly from the lower end of lower joint member 156 is a sleeve 164 which terminates at its own lower end on the welding head not shown. Welding wire 120 passes through sleeve 164 to enter the welding head. This sleeve, like sleeve 110 of the apparatus of FIG. 1, should be of an electrically insulating material, and may be flexible and provided with at least a little slack between lower joint member 156 and the welding head.

In its course between compression fitting 136 and guide rolls 144 and 146, flexible sleeve 134 containing welding wire 120 passes through guide rolls 166 and 168. These latter rolls are rotatably mounted in stroking bar 170. This bar also carries a wrist pin 172 fixedly fitted in its left end, and is itself supported by and free to move transversely back and forth on the bearing surfaces of foundations 174, 176, 178, and 180. These four foundations are all fixed in space with respect to all other foundations hereinbefore designated in connection with the apparatus of FIG. 6.

According to the present invention, certain limited transverse motion of an alternating and cyclical nature may be imposed on stroking bar 170. Such motion of this bar will, of course, be transmitted to guide rolls 166 and 168, and also to the portions of sleeve 134 and wire 120 passing through or closely adjacent these rolls. Driving power for imposing motion of the kind described upon stroking bar 170 is furnished by electric motor 182. This motor is supported from foundation 184 which is fixed in space with respect to all other foundations hereinbefore designated in connection with the apparatus of FIG. 6.

Motor 182 has an output shaft 186 to which is affixed a crank 188. This crank is provided with a crank pin block 190 which has a crank pin 192 fixedly fitted therein. Like block 82 on crank 80 of FIG. 1, block 190 has a sliding fit on crank 188. It may be clamped at a plurality of positions along the crank by means not shown such as a set screw corresponding to screw 86 in block 82. By adjustment of the position of block 190 on crank 188, the effective crank throw which is the offset between motor shaft 186 and crank pin 192 may be varied. A connecting rod 194 joins crank pin 192 with wrist pin 172 on stroking bar 170 to complete the mechanical power transmission linkage between motor 182 and guide rolls 166 and 168.

It is apparent that as the effective throw of crank 188 is varied by adjustment of the position of crank pin block 190 therealong, the amplitude of displacement or the stroke of stroking bar 170 and guide rolls 166 and 168 in the course of one revolution of motor 182 will be varied also. The shorter the effective crank throw, the shorter will be the translatory displacement of guide rolls 166 and 168 measured at the point between them wherethrough welding wire 120 passes. For purposes of this invention it will be desirable not only that the stroke of bar 170 and the guide rolls carried on it be variable, but also that the oscillatory frequency of these parts in translation be subject to change. This condition may be achieved quite easily by having electric motor 182 of a variable speed variety. Specifically, like motor 74 in FIG. 1, motor 182 may be a direct current machine having a speed adjustment rheostat in one of its field coil leads.

To consider the overall operation of the apparatus embodiment of this invention shown in FIG. 6, with reference to earlier figures as necessary, suppose that motor 182 is not energized; that motor 126 is energized to turn drive rolls 122 and 124 to advance welding wire 120 continuously; that an arc has been struck between the lower end of wire 120 and base elements 22 and 24, and that there is steady relative motion of the lower end of the welding wire along the groove between the base elements to deposit weld metal in this groove and join these elements. In these circumstances, upon the achievement of stable conditions of operation, wire 120 will be burning back at its lower end at the same rate at which it is being advanced through rolls 122 and 124; that is, the lower end of wire 120 will be in an essentially fixed vertical relation with respect to the top and bottom edges of the groove between base elements 22 and 24.

Now suppose that motor 182 is started to impose translatory motion of an oscillating or reciprocating nature upon stroking bar 170 and guide rolls 166 and 168 mounted therein. As these rolls are moved from side to side continuously, at least a portion of sleeve 134 and welding wire 120 within it will be cyclically flexed, and the path which wire 120 must follow from drive rolls 122 and 124 to the welding head will be alternately and cyclically lengthened and shortened as upper joint member 138 rises and falls on lower joint member 156.

For reasons corresponding to those stated hereinbefore as determining the behavior of the lower end of wire 10 in the apparatus of FIG. 1, the lower end of welding wire 120 will be oscillated up and down with respect to the edges of the groove between base elements 22 and 24. Such oscillation of the lower end of the wire will in turn cause oscillation of the arc up and down in the welding groove. Frequency of oscillation of the wire and the arc may be adjusted by means of the field rheostat controlling the speed of motor 126. Amplitude of oscillation may be adjusted by means of crank pin block 190 wherethrough the effective throw of crank 188 of motor 182 is regulated.

Figure 7:
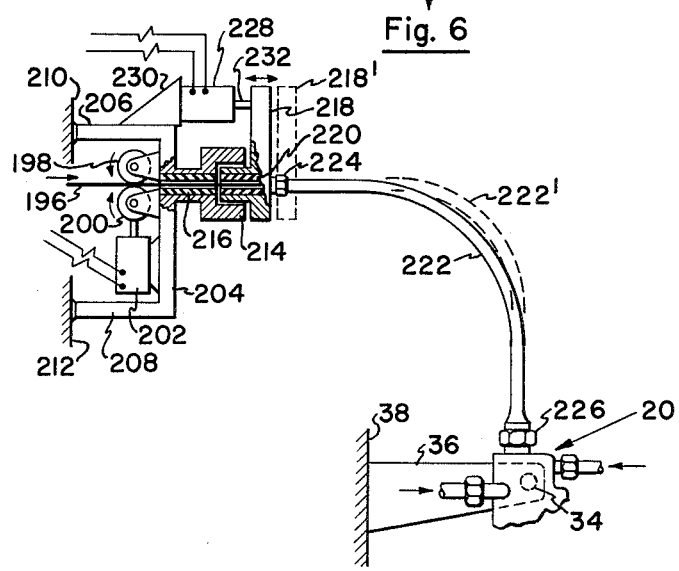
FIG. 7 represents a partially schematic and partially structural diagram of another apparatus embodiment of this invention wherein the welding wire is cyclically flexed.

Referring finally to FIG. 7, welding wire 196 is moved to the right between a pair of electrically insulated drive rolls 198 and 200 which are rotated by motor 202. These rolls and this motor are located on a support plate 204 having rigidly attached leg portions 206 and 208 which extend back to and are retained fixedly on foundations 210 and 212 respectively. At its left and upper end, wire 196 may be assumed as coming in from a storage and dispensing apparatus such as that of FIG. 1 comprising reel 12, shaft 14, bracket 16, and foundation 18. This latter foundation will be in fixed spatial relation to foundations 210 and 212. A wire-consuming apparatus similar to that of FIG. 1 comprising welding head 20, pin 34, bracket 36, and foundation 28 is shown at least in part in FIG. 7. Foundation 38 will be in fixed spatial relation to foundations 210 and 212.

At its right and lower end, as will be shown more clearly hereinafter, welding wire 196 passes through and may be assumed as being continuously burned off beyond welding head 20. Burning off of wire 196 may be assumed to be taking place in the course of making a welded joint across a groove between two base elements such as 22 and 24 shown in FIG. 2. A direct current generator such as generator 40 may be assumed to be present and connected in reverse polarity to welding wire 196 similarly to wire 10 on the one hand and the base elements, likewise all as shown in FIG. 1. Further, relative motion may be assumed between the welding head and the base elements to provide a traverse of the head and thus of welding wire 196 along the groove between the elements being joined.

Support plate 204 is provided with a hole wherethrough welding wire 196 passes rightwardly after leaving drive rolls 198 and 200. Fixedly mounted to the right hand side of the support plate and itself having a hole essentially coaxial with that in the plate, is a guide and bearing bracket 214. Assuming plate 204 and bracket 214 to be metallic structures, they will be fitted with an electrically insulating sleeve or bushing such as 216 which, as shown, extends through at least part of the aforementioned holes in both the support plate and the bearing bracket. At its righ hand side, bracket 214 is bored out to an enlarged diameter and properly finished internally as a bearing surface to accommodate a cylindrical left hand portion of a stroking bracket 218. This latter bracket itself has a through hole essentially coaxial with those in support plate 204 and bearing bracket 214, and like them fitted with an electrically insulating sleeve or bushing 220 wherethrough wire 196 passes. Besides having the aforementioned cylindrical left hand portion with a horizontal bore axis as shown, stroking bracket 218 also comprises a substantially vertically extending right hand portion of which the function will be indicated hereinafter.

As it extends rightwardly and downwardly from stroking bracket 218 toward the welding head, welding wire 196 is encased in a flexible and electrically insulating sleeve 222. At its left hand and upper end, sleeve 134 is connected to the right hand side of stroking bracket 218 by any suitable means such as a compression fitting 224. At its right hand and lower end, sleeve 134 is connected to welding head 20 by any suitable means such as compression fitting 226.

According to the present invention, certain limited transverse motion of an alternating and cyclical nature may be imposed on stroking bracket 218. Driving power for this motion is furnished by solenoid-type electric vibrator 228 which will be energized by alternating current. This vibrator is supported rigidly from a bracket 230 which in turn is fitted fixedly onto leg portion 206 of support plate 204. Vibrator 208 has an output shaft or plunger 232 which is fastened to the vertically extending right hand portion of stroking bracket 218 in a manner to allow the plunger to both push and pull on this bracket.

To consider the overall operation of the apparatus embodiment of this invention shown in FIG. 7, with reference to earlier figures as necessary, suppose that vibrator 228 is not energized; that motor 202 is energized to turn drive rolls 198 and 200 to advance welding wire 196 continuously; that an arc has been struck between the lower end of wire 196 and base elements 22 and 24, and that there is steady relative motion of the lower end of the welding wire along the groove between the base elements to deposit weld metal in this groove and join these elements. In these circumstances, upon the achievement of stable conditions of operation, wire 196 will be burning back at the same rate at which it is being advanced through rolls 198 and 200; that is, the lower end of wire 120 will be in an essentially fixed vertical relation with respect to the top and bottom edges of the groove between base elements 22 and 24.

Now suppose that vibrator 228 is started to impose translatory motion of an oscillating or reciprocating nature upon stroking bracket 218. As this bracket is moved from side to side continuously, sliding rightwardly out of and then leftwardly back into bearing bracket 214, sleeve 222 and welding wire 196 within it will be cyclically flexed in bending, achieving a condition of extreme flexure as indicated by sleeve $222^1$ in dashed outline with stroking bracket being in the position indicated as $218^1$, also shown dashed. In the course of this flexuring, the path which wire 196 must follow from drive rolls 198 and 200 to welding head 20 will be alternately and cyclically lengthened and shortened. Although not shown specifically in FIG. 7, it is apparent that insulating sleeves or bushings 216 and 220 may be of splined configuration to form a sliding joint similar to that particularly illustrated in FIGS. 4 and 5.

For reasons corresponding to those stated hereinbefore as determining the behavior of the lower end of wire 10 in the apparatus of FIG. 1, the lower end of welding wire 196 will be oscillated up and down with respect to the edges of the groove between base elements 22 and 24. Such oscillation of the lower end of the wire will in turn cause oscillation of the arc up and down in the welding groove as is desired in keeping with the method of this invention.

In an actual reduction to practice of this invention, an apparatus has been constructed substantially similar to that shown in FIG. 7 having the following operating characteristics:

Welding wire speed at drive rolls
(speed of wire 196 at drive rolls
198 and 200)_____ 560 inches/minute.
Frequency of wire path length variation (frequency of plunger 232 of
vibrator 228)_____ 120 cycles/second.

Using this apparatus constructed generally according to that shown in FIG. 7, tests have been carried out for the welding of base elements corresponding to elements 22 and 24 shown in FIG. 2, each having a thickness of about 0.375″. These elements were separated initially, again as shown in FIG. 2, by a parallel-sided groove or gap having a width of about 0.060″. The welding wire employed had a diameter of about 0.040″. The welding supply potential for maintenance of the arc was about 27.5 volts direct, and the welding current was about 360 amperes.

Oscillographic records were taken of wire feed speed at the welding head. Best results in respect of root conditions of the joint formed were obtained with the stroke of the vibrator plunger set to give an average total wire feed speed change of about 107% of the speed at the drive rolls in the course of one complete oscillation; that is, provide a difference of about 600 inches/minute between the maximum and minimum speeds of any given cycle.

Over an extended period of operation, the maximum wire feed speed measured at the welding head on any cycle was about 840 inches/minute (150% of 560 i.p.m.), and the minimum was about 180 inches/minute (32% of 560 i.p.m.) for a maximum difference between wire feed speeds at the welding head of about 660 inches/minute. This value, about 10% in excess of the approximate 600 inches/minute difference in wire feed speeds on any given cycle of the vibrator, indicated that there was some "drift" in the mean speed of the wire at the welding head. It is likely that such drift was due to local flexing of the welding wire within its enclosing sleeve (flexuring of wire 196 within sleeve 222) superimposed on the general flexing of the wire caused by motion of the sleeve in response to action of the vibrator.

Although not illustrated specifically, another apparatus embodiment of this invention has been constructed generally similar to that shown in FIG. 7, but with the particular difference of having a variable speed motor and variable throw crank mechanism instead of a vibrator for imposing translatory motion of an oscillating nature upon stroking bracket 218. This apparatus has the following operating characteristics:

| | |
|---|---|
| Welding wire speeds at drive rolls (speeds of wire 196 at drive rolls 198 and 200) | 300 and 600 inches/minute. |
| Range of frequencies of wire path length variation (range of oscillating frequencies imposed on stroking bracket 218 by the variable speed motor) | 20–2000 cycles/minute. |
| Range of maximum lineal displacements of stroking bracket 218 according to effective throw of the crank mechanism [1] | 0.027–0.075 inch. |

[1] Measurements taken on a static basis. Actual values of changes in wire feed speed at welding head measured in dynamic cases ran to more than 100% in excess of values corresponding to static displacement only for a given wire speed at the drive rolls and frequency of oscillation of the stroking bracket.

In determining these operating characteristics for both of the above-described actual reductions to practice of the present invention, welding wire having a diameter of about 0.040" was employed. The greatest variation in wire feed speed over an extended period of operation, calculated as the difference between maximum and minimum speeds taken as a percentage of the mean wire feed speed, was about 118% (150%–32%). In both cases, the base elements joined by welding had a thickness of about 0.375".

It is to be understood that the values of operating characteristics given above are not necessarily optimum or even desirable values for all conditions of welding in a narrow deep groove using the apparatus and method of this invention. In particular, the preferable values or ranges of values of these characteristics are likely to change for the achievement of good fusion at the root of the weld as thickness of the base elements being joined is increased. These preferable values may be expected to change also with changes in welding wire diameter. Wires in the diametral range of about 0.015" to about 0.094" are used widely.

The required operating characteristics for best results in narrow deep groove, oscillating arc welding of elements substantially thicker than about 0.375" have not been firmly established quantitatively. It is at least known from experiment, however, that increasing the amplitude of wire feed speed change, that is, increasing the difference between maximum and minimum speeds taken as a percentage of the mean wire feed speed, will cause deeper penetration of the arc into the groove between the elements being joined. Qualitatively, it may be expected that such deeper penetration will be needed with increasing base element thickness. On the other hand, for any given thickness of base elements, arc penetration may not be increased indefinitely without causing burn-through at the bottom of the groove.

Amplitudes of wire feed speed change, as defined above, of more than 1000% have been tried experimentally for the welding of base elements having a thickness of about 0.375". While such large amplitudes of speed change appeared to result in too great penetration of the arc for the given thickness of base elements whereon the experiments were performed, the experience gained did provide support for the qualitative expectation stated above.

Although this invention has been described with a certain degree of particularity, it is to be understood that the present disclosure has been made only by way of example, especially with regard to numerical quantities given herein, and that numerous changes in the details of construction and the combination and arrangement of parts may be resorted to without departing from the spirit and scope of this invention as hereinafter claimed. Specifically, it is within the contemplation of the present invention that a controlled variation may be imposed upon the speed of feeding of the welding wire at the point of arcing by a method or methods other than those calling for alternately and cyclically lengthening and shortening the path taken by the wire in its passage from the drive rolls to the welding head. Such other methods would include use of a controlled variation of the speed of turning of the drive rolls, and also use of a controlled variation of the contour of the rolls themselves on their surfaces intended to impart motion to the wire.

What is claimed is:

1. An arc welding apparatus for joining metal elements which are disposed in spaced relation to define a groove region therebetween, said apparatus comprising (1) a welding head adapted to receive a continuously moving welding wire and be positioned adjacent said groove region for directing said wire thereinto, (2) driving means whereby motion toward said welding head may be imparted to said wire, said driving means including at least two rolls wherebetween said wire may be passed in contacting relation to each roll and which rolls are maintained in controllably spaced relation to said welding head, (3) guiding means including said rolls wherebetween and wherethrough said wire may be passed intermediate said driving means and said welding head and which serve to define at least in part the path taken by said wire from said driving means to said welding head, and (4) stroking means operatively engaged with said guiding means whereby said path may be alternately and cyclically lengthened and shortened.

2. An arc welding apparatus according to claim 1 in which said stroking means includes speed control means effective to vary the frequency at which the path taken by said wire from said driving means to said welding head may be alternately and cyclically lengthened and shortened.

3. An arc welding apparatus according to claim 1 in which said stroking means includes displacement control means effective to vary the amplitude through which the path taken by said wire from said driving means to said welding head may be alternately and cyclically lengthened and shortened.

4. An arc welding apparatus according to claim 1 in which said stroking means comprises an electric motor.

5. An arc welding apparatus according to claim 1 in which said stroking means comprises a solenoid-type electric vibrator.

6. An arc welding apparatus according to claim 1 in which said guiding means additionally includes a multi-member sliding joint structure wherethrough said wire may be passed in following said path, said joint structure being configured to provide at least some lateral support to said wire along the full length of the wire passing therethrough for all working conditions of relative adjustment of the members of said sliding joint structure.

7. An arc welding apparatus for joining metal elements which are disposed in spaced relation to define a groove region therebetween, said apparatus comprising (1) a welding head adapted to receive a continuously moving welding wire and be positioned adjacent said groove region for directing said wire thereinto, (2) driving means whereby motion toward said welding head may be imparted to said wire, said driving means being maintained in spaced relation to said welding head, (3) guiding means wherethrough said wire may be passed intermediate said driving means and said welding head and which serve to define at least in part the path taken by said wire from said driving means to said welding head, said guiding means including a flexible sleeve which encases at least a portion of the length of the wire passing through said guiding means, and (4) stroking means operatively engaged with said sleeve whereby at least a portion of said sleeve may be flexed in bending and said path be alternately and cyclically lengthened and shortened.

8. An arc welding apparatus according to claim 7 in which said stroking means is operatively engaged with said sleeve in a region of said sleeve intermediate the ends of the portion thereof which may be flexed in bending.

9. An arc welding apparatus according to claim 7 in which said stroking means is operatively engaged with said sleeve at at least one end of the portion thereof which may be flexed in bending.

10. An arc welding method for joining metal base elements which are disposed in spaced relation to define a groove region therebetween, said method comprising the steps of (1) operatively engaging an extended length of welding wire with driving means; (2) passing one end of said wire through welding head means and thereby directing said one end into said groove region; (3) imposing an electrical potential difference upon said wire and said base elements sufficient to strike an arc between said one end of said wire and said elements, and thereby consume said wire from said one end thereof with deposition of at least some material consumed therefrom in a molten condition in said groove region; (4) actuating said driving means to feed said wire through said welding head means toward said groove region to maintain said arc, and (5) alternately and cyclically lengthening and shortening the path taken by said wire from said driving means to said welding head means, and thereby imposing a controlled variation on the speed of feeding said wire into said groove region, this last-described step including the step of cyclically flexing in bending at least a portion of said wire driving means and said welding head.

11. An arc welding method for joining metal base elements which are disposed in relation to each other to define a weld material deposit region for joint formation, said method comprising the steps of (1) operatively engaging an extended length of welding wire with driving means; (2) passing one end of said wire through welding head means and thereby directing said one end into said deposit region; (3) imposing an electrical potential difference upon said wire and said base elements sufficient to strike an arc between said one end of said wire and said elements, and thereby consume said wire from said one end thereof with deposition of at least some material consumed therefrom in a molten condition in said deposit region; (4) actuating said driving means to feed said wire through said welding head means toward said deposit region to maintain said arc, and (5) alternately and cyclically lengthening and shortening the path taken by said wire from said driving means to said welding head means, and thereby imposing a controlled variation on the speed of feeding said wire into said deposit region, this last-described step including the step of cyclically flexing in bending at least a portion of said wire intermediate said driving means and said welding head.

12. An arc welding method according to claim 11 in which said wire has a diameter in the range of about 0.015 inch to about 0.094 inch.

13. An arc welding method according to claim 11 in which said wire has a diameter of about 0.040 inch.

14. An arc welding method according to claim 10 in which said groove region is about 0.060 inch wide.

15. An arc welding method according to claim 11 in which said speed of feeding said wire is alternately and cyclically increased and decreased through a total speed change equal to at least about 107% of the mean speed of feeding.

16. An arc welding method according to claim 10 in which said speed of feeding said wire into said groove region is alternately and cyclically increased and decreased in the range of about 180 inches/minute to about 840 inches/minute.

17. An arc welding method according to claim 10 in which said speed of feeding said wire into said groove region is alternately and cyclically increased and decreased at a frequency not greater than about 120 cycles/second.

References Cited in the file of this patent

UNITED STATES PATENTS

| | | |
|---|---|---|
| 1,497,071 | Daykin | June 10, 1929 |
| 1,712,114 | Kjekstad | May 7, 1929 |
| 1,984,809 | Requa | Dec. 18, 1934 |